United States Patent [19]

Fisher

[11] 4,332,049
[45] Jun. 1, 1982

[54] ESCAPE SLIDE AND PROTECTIVE SHIELD

[75] Inventor: John M. Fisher, Cuyahoga Falls, Ohio

[73] Assignee: The B. F. Goodrich Company, Akron, Ohio

[21] Appl. No.: 122,391

[22] Filed: Feb. 19, 1980

[51] Int. Cl.³ .................. B61G 9/00; B64D 25/14
[52] U.S. Cl. ............................ 441/80; 182/48; 182/47; 193/25 B; 244/137 P; 244/DIG. 2; 169/48; 441/40
[58] Field of Search ......... 244/137 P, 118 P, DIG. 2, 244/121; 182/46-48; 193/25 B; 9/11 A, 14; 169/48

[56] References Cited

U.S. PATENT DOCUMENTS

| | | | |
|---|---|---|---|
| 440,244 | 11/1890 | Bacheller | 182/47 |
| 816,183 | 3/1906 | Pugh | 182/47 |
| 3,034,154 | 5/1962 | Silverstone | 9/11 A |
| 3,464,515 | 9/1969 | Evans | 244/DIG. 2 |
| 3,473,641 | 10/1969 | Fisher | 244/DIG. 2 |
| 3,490,085 | 1/1970 | Lewis | 9/11 A |
| 3,833,088 | 9/1974 | Chacko | 244/DIG. 2 |
| 3,990,464 | 11/1976 | Jenkins | 169/48 |
| 4,099,596 | 7/1978 | Tracy | 182/48 |

Primary Examiner—Galen L. Barefoot
Attorney, Agent, or Firm—Harry F. Pepper, Jr.

[57] ABSTRACT

An escape slide for evacuating personnel from an aircraft or other elevated place where there is the possibility of damage to the slide from fire or abrasion during the deployment and evacuation process. A protective shield of flexible material having a metalized coating for reflecting heat is positioned over the underside of the inflated slide to protect the slide. The protective shield may be connected to the sides of the slide and be spaced from the bottom of the slide to provide an insulating air space. The protective shield may also be movable to a position over the slide when used as a life raft and serve as a canopy to protect passengers on the slide raft from the weather and sea.

3 Claims, 3 Drawing Figures

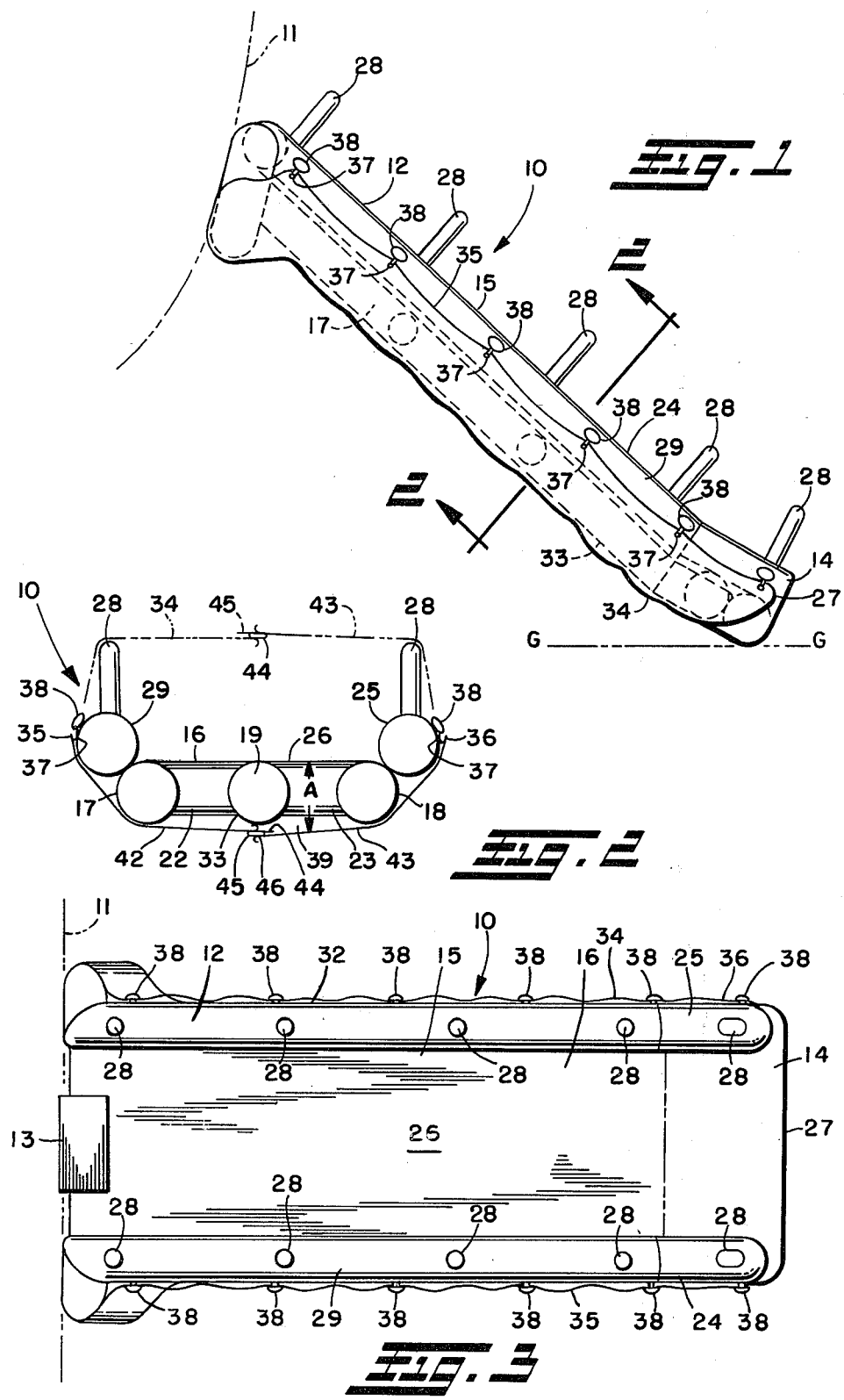

ESCAPE SLIDE AND PROTECTIVE SHIELD

BACKGROUND OF THE INVENTION

This invention relates to an aircraft evacuation system and especially to an inflatable escape slide which may also serve as a raft when the aircraft is ditched in the water. There has been an aircraft crash when radiant heat from a fire resulting from the crash damaged some of the escape slides and caused them to fail. There is therefore a need to make an escape slide heat resistant; however, it is also important to keep the weight of the escape slide assembly to a minimum and avoid replacement of existing escape slides. In addition, extra protection of the inflatable escape slide is desirable to protect the walls of the slide from damage and puncture due to abrasion by damaged parts of the fuselage and by rocks and other rough surfaces on the ground during deployment of the slide. Insulation of the inflatable slide is also desirable because this reduces the amount of heat-resistant material which must be added to the surface of the slide assembly and therefore minimize the increase in weight and additional storage space needed for the slide assembly.

SUMMARY OF THE INVENTION

Briefly, one aspect of the invention involves providing a protective shield of flexible sheet material extending over the bottom portion of the slide which is generally exposed to a fire and abrasion.

In accordance with another aspect of the invention, the protective shield is fastened to the side edges of the shield to cover the sides of the escape slide in addition to the bottom.

In accordance with a further aspect of the invention, the protective shield has a metalized coating to reflect heat and is spaced from the bottom of the slide providing an air space to further insulate the slide.

In accordance with a still further aspect of the invention, the protective shield may be movable to a position over the top of the slide and serve as a canopy when the slide is used as a life raft.

BRIEF DESCRIPTION OF THE DRAWINGS

FIG. 1 is a partially schematic side view of an inflated escape slide embodying this invention in the deployed condition mounted on an aircraft and ready for evacuation of passengers.

FIG. 2 is an enlarged sectional view taken along the plane of line 2—2 in FIG. 1 and showing the protective shield in solid lines while in position to provide protection from heat and abrasion and in chain-dotted lines while in position to provide a canopy when the slide is used as a life raft.

FIG. 3 is a partially schematic plan view of the escape slide of FIG. 1.

DETAILED DESCRIPTION

Referring to FIGS. 1, 2 and 3, a multitubular inflatable escape slide 10 is shown schematically in the inflated condition in position for evacuating passengers from an elevated supporting structure such as an aircraft having a fuselage 11 shown in FIGS. 1 and 3 by chain-dotted lines. The escape slide 10 has an upper end 12 at an elevated position which is attached to the fuselage 11 by suitable means such as girt 13. The escape slide 10 has a lower end 14 supported on a lower surface such as the ground, indicated by dot-dash ground line G—G. Between the upper end 12 and lower end 14 of the slide 10 is a slide portion 15 having an upper surface 16 on which passengers may slide when evacuating the aircraft.

As shown in the drawings, the slide 10 has a multitubular construction including a left-hand lower side tube 17, a right-hand lower side tube 18 and a central main tube 19, all of which extend longitudinally of the slide from the upper end 12 to the lower end 14. The side tubes 17 and 18 and the central main tube 19 may be connected by connecting tubes 22 and 23 positioned at spaced-apart locations along the slide 10 and at the lower end 14 and upper end 12. The slide 10 also has a longitudinally extending left-hand upper side rail tube 24 mounted on top the left-hand lower side tube 17 and a right-hand upper side rail tube 25 mounted on top the right-hand lower side tube 18. These side rails tubes 24 and 25 are connected by U-shaped tubes at the upper end 12 and lower end 14. A center slide panel 26 is fastened to the lower side tubes 17 and 18 and to the central main tube 19 between the upper side rail tubes 24 and 25 providing the upper surface 16 on which the passengers may slide to a toe end 27 of the slide 10 at the lower end 14. Inflatable canopy supports 28 may be mounted on the top surfaces of the side rail tubes 24 and 25 as shown in the drawings.

The left-hand lower side tube 17 and left-hand upper side rail tube 24 form a left-hand side portion 29 of the escape slide 10. The right-hand lower side tube 18 and right-hand upper side rail tube 25 form a right-hand side portion 32 of the escape slide 10. On the opposite side of the escape slide 10 from the upper surface 16 of the center slide panel 26 is a bottom portion 33 extending between the side portions 29 and 32.

A protective shield 34 of flexible sheet material extends between the left-hand side portion 29 and right-hand side portion 32 covering the bottom portion 33 and part of the side portions as shown in FIGS. 1 and 2. The protective shield 34 has side edges 35 and 36 which are fastened to the side portions 29 and 32 by suitable means such as cord-type fasteners 37 having cords which are wrapped around mushroom-shaped cleats 38 mounted on the sides of the rail tubes 24 and 25. The protective shield 34 preferably has a width measured between the side edges 35 and 36 which is substantially greater than the distance between the side portions 29 and 32 of the slide providing an air space 39 between the bottom portion 33 of the escape slide 10 and the shield. The distance A between the bottom portion 33 of the escape slide 10 and the shield 34 may be up to 16 inches (40.6 centimeters) in the embodiment shown to provide insulation when the protective shield is exposed to radiant heat in the event a fire occurs during an emergency landing of an aircraft.

The protective shield 34 may be made of a lightweight square-woven nylon cloth coated with a urethane elastomer which may contain an aluminum pigmented elastomeric coating for reflecting the heat. The escape slide 10 may be constructed of a suitable flexible material such as square-woven nylon fabric impregnated with neoprene to retain air or other inflation medium in the inflatable parts. The slide panel 26 may also be of square-woven nylon and adhered to the slide portion 15 by a suitable adhesive. The escape slide 10 may be inflated by suitable means (not shown) to an initial pressure of about 3 pounds per square inch (0.21 kilograms per square centimeter). The inflation system may be of a sufficient size to inflate the escape slide 10 in about two seconds inflation time.

As shown in FIG. 2, the protective shield 34 is divided into two longitudinally extending sections 42 and 43 with center edges 44 and 45, respectively, releasably fastened together by suitable fasteners 46. These fasteners 46 may be of three-dimensional fabric having stiff, hooked fibers extending outwardly from each of the center edges 44 and 45 for engagement with the fibers of the opposing members. The fabric may be a woven nylon-type material and consists of hook-type fibers which are monofilaments. The opposing fibers of the fasteners 46 interconnect for holding the opposing edges 44 and 45 together during deployment of the slide 10 but may be pulled apart by passengers using the escape slide for a raft.

As shown in FIG. 2, the protective shield 34 may be pulled apart and positioned over the top of the slide portion 15 with the center edges 44 and 45 connected by the fasteners 46 to form a canopy which will protect the passengers from the weather and sea. The aluminum pigmented elastomeric coating on the protective shield 34 will serve to reflect body heat of the people in the slide 10 when the shield is used as a canopy and thereby maintain the interior temperature. The metalized surface will also reflect any interior light and thereby provide improved visibility within the slide when it is used as a raft. The metalized surface also presents a radar target which would be of help in finding the slide when used as a raft.

As indicated, the slide 10 and protective shield 34 described and shown have substantially the same weight as an escape slide life raft assembly with canopy used heretofore. Also the protective shield 34 and slide 10 may be packed in substantially the same space required for escape raft assemblies used heretofore.

Upon deployment of the escape slide 10 the protective shield 34 automatically is positioned over the bottom portion 33 and parts of the side portions 29 and 32 so that if a fire is located at that side of the slide, the reflective surface will provide protection from radiant heat and the air space 39 will provide insulation. Also in the event of a forced landing, the protective shield 34 will protect the slide 10 from puncture or damage due to abrasion from the fuselage 11 at the upper end 12 and from rocks and other rough surfaces on the ground line G—G at the lower end 14.

The protective shield 34 may be of a sewn construction, if desired, and need not have a surface which must be cemented to other surfaces of the escape slide. This makes possible other metallic coatings of the shield 34, if desired.

It is understood that this invention is capable of other modifications and adaptions by those having ordinary skill in the art and is more particularly defined by the appended claims.

I claim:

1. An escape slide adapted to be inflated and extend from an upper end at an elevated position to a lower end at a lower surface comprising a slide portion including an upper surface on which persons are transported, side portions at each edge of said side portions, and a protective shield of flexible sheet material covering said bottom portion and at least a part of said side portions, wherein said protective shield is divided into at least two longitudinally extending sections having center edges releasably fastened together so that said sections may be detached and positioned over said upper surface as a canopy to protect persons using said escape slide as a life raft.

2. An escape slide in accordance with claim 1 wherein said escape slide has inflatable canopy supports positioned at said side portions for supporting said shield as a canopy in a sheltering location above said upper surface.

3. An escape slide in accordance with claim 1 wherein said two sections have attachment means for connecting said center edges after said sections are positioned over said upper surface of said escape slide.

* * * * *